United States Patent
Su

(10) Patent No.: US 9,652,250 B2
(45) Date of Patent: May 16, 2017

(54) CONTROLLER INITIALIZING DEVICE AND METHOD

(71) Applicant: HON HAI PRECISION INDUSTRY CO., LTD., New Taipei (TW)

(72) Inventor: Fang-Cing Su, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/859,614

(22) Filed: Sep. 21, 2015

(65) Prior Publication Data

US 2017/0060596 A1    Mar. 2, 2017

(30) Foreign Application Priority Data

Aug. 26, 2015   (CN) .......................... 2015 1 0529546

(51) Int. Cl.
*G06F 9/44*    (2006.01)
(52) U.S. Cl.
CPC ................................ *G06F 9/4401* (2013.01)

(58) Field of Classification Search
CPC ...................................................... G06F 9/4401
See application file for complete search history.

(56) References Cited

U.S. PATENT DOCUMENTS

| | | | | |
|---|---|---|---|---|
| 5,850,562 A * | 12/1998 | Crump | ................ | G06F 11/3466 713/1 |
| 8,060,785 B2 * | 11/2011 | Lin | ...................... | G11C 29/028 713/1 |
| 8,898,517 B2 * | 11/2014 | Cheng | ................. | G06F 11/1417 713/2 |
| 2016/0261455 A1 * | 9/2016 | Su | .......................... | H04L 41/069 |

* cited by examiner

*Primary Examiner* — Stefan Stoynov
(74) *Attorney, Agent, or Firm* — Steven Reiss

(57) ABSTRACT

A controller initializing device and method is configured to initialize controllers. When a device is powered on, a basic input and output system of the device initializes a first chip of the device. The basic input and output system starts a power on self test and initializes a first controller of the device. The basic input and output system outputs a trigger signal when the power on self test of the basic input and output system ends. A baseboard management controller of the device accesses the first controller when the baseboard management receives the trigger signal.

7 Claims, 2 Drawing Sheets

CONTROLLER INITIALIZING DEVICE AND METHOD

FIELD

The subject matter herein generally relates to a controller initializing device and a controller initializing method.

BACKGROUND

A controller should be initialized before being accessed. The controller will operate abnormally if the controller is not initialized.

BRIEF DESCRIPTION OF THE DRAWINGS

Implementations of the present technology will now be described, by way of example only, with reference to the attached figures.

DETAILED DESCRIPTION

Figure 1:
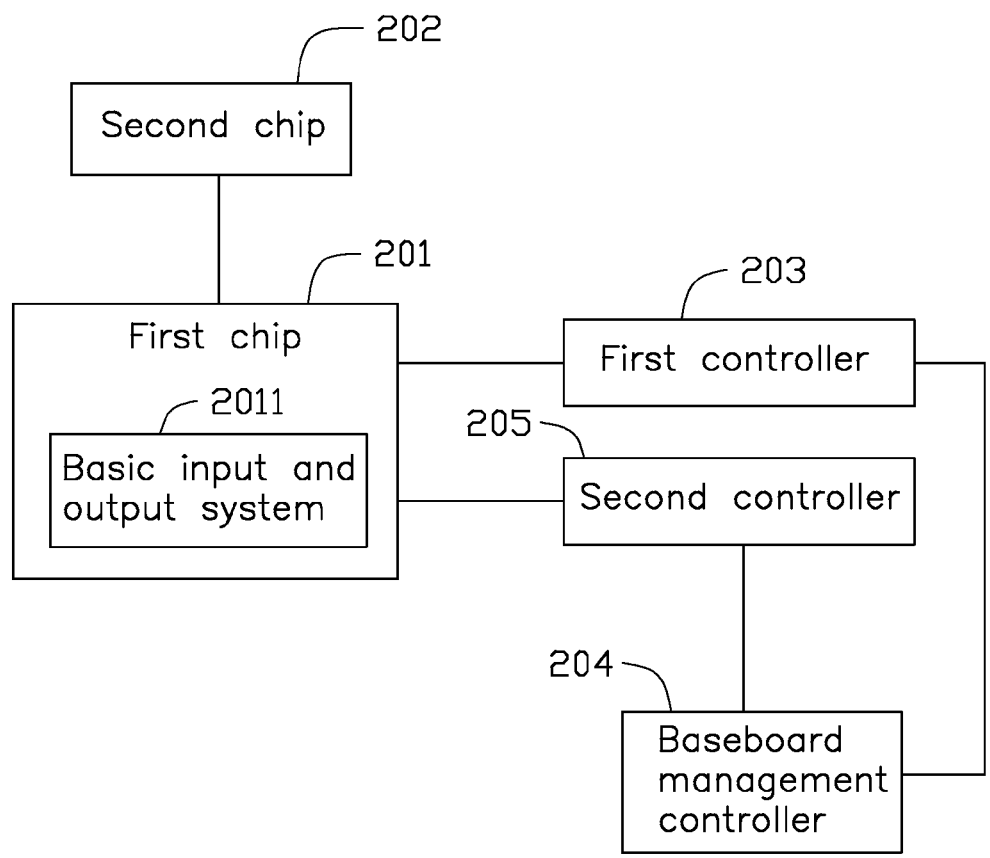
FIG. 1 is a block diagram of an embodiment of a controller initializing device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

FIG. 1 shows an electronic device 200. The electronic device 200 can comprise a first chip 201, a second chip 202, a first controller 203, a second controller 205, and a baseboard management controller 204.

A basic input and output system 2011 is programmed in the first chip 201. The first chip is coupled to the second chip 202. The first controller 203 is coupled to the second chip 202. The baseboard management controller 204 is coupled to the second chip 202 and the first controller 203.

Figure 2:
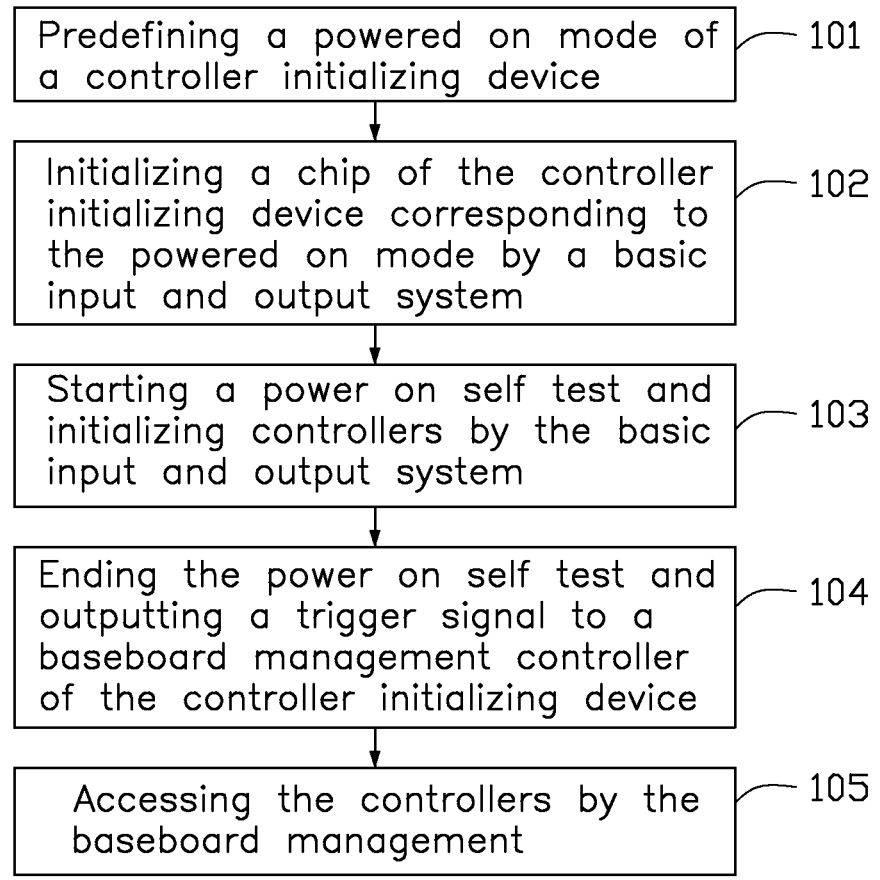
FIG. 2 is a flow chart of an embodiment of a method to initialize controller of the present disclosure.

FIG. 2 illustrates a flowchart of an exemplary method for processing a plurality of commands for initializing controllers. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 101.

At block 101, the electronic device 200 can predefine a powered on mode, the basic input and output system 2011 starts to operate according to the powered on mode.

At block 102, the basic input and output system 2011 initializes the first chip 201.

At block 103, the basic input and output system 2011 starts to output a power on self test signal and the basic input and output system 2011 initializes the first controller 203 and the second controller 205.

At block 104, the power on self test of the basic input and output system 2011 is ended and a trigger signal is output to the baseboard management controller 204.

At block 105, the baseboard management controller 204 starts to access the first controller 203 and the second controller 205.

Therefore, the baseboard management controller 204 can access the first controller 203 and the second controller 205 when the baseboard management controller 204 receives the trigger signal. Thus the baseboard management controller 204 accesses the first controller 203 and the second controller 205 after the first controller 203 and the second controller 205 are initialized.

In the illustrated embodiment, the electronic device 200 can be a server. The second chip 202 can be a central processing unit. The first controller 203 can be a temperature sensor. The second controller 205 can be a speed sensor of a fan.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A controller initializing device comprising:
   a first chip programmed to include a basic input and output system;
   a second chip coupled to the first chip;
   a first controller coupled to the first chip; and
   a baseboard management controller coupled to the first chip and the first controller, the baseboard management controller configured such that in event the controller initializing device is powered on, the basic input and output system initializes the second chip, the basic input and output system starts a power on self test and initializes the first controller, the basic input and output system outputs a trigger signal when the power on self test of the basic input and output system ends, the baseboard management controller accesses the first controller when the baseboard management controller receives the trigger signal.

2. The controller initializing device as claim 1, wherein the controller initializing device is a server.

3. The controller initializing device as claim 2, wherein the second chip is a central processing unit.

4. The controller initializing device as claim 1, wherein the first controller is a temperature sensor.

5. The controller initializing device as claim 1, further comprising a second controller, wherein the second controller is coupled to the first chip and the baseboard management controller, the basic input and output system starts the power on self test and initializes the second controller, the basic input and output system outputs the trigger signal in event the power on self test of the basic input and output system ends, the baseboard management controller accesses the second controller when the baseboard management controller receives the trigger signal.

6. The controller initializing device as claim 5, wherein the second controller is a speed sensor.

7. A controller initializing method, comprising:
- predefining a powered on mode of a controller initializing device;
- initializing a chip of the controller initializing device corresponding to the powered on mode by a basic input and output system;
- starting a power on self test and initializing controllers by the basic input and output system;
- ending the power on self test and outputting a trigger signal to a baseboard management controller of the controller initializing device;
- accessing the controllers by the baseboard management controller.

* * * * *